July 17, 1962        R. I. JAFFEE        3,044,160

METHOD OF PRODUCING RIBBED METAL SANDWICH STRUCTURES

Filed March 3, 1958

INVENTOR.
ROBERT I. JAFFEE

BY *Gray, Mase*
*& Dunson*

ATTORNEY

United States Patent Office 3,044,160
Patented July 17, 1962

3,044,160
METHOD OF PRODUCING RIBBED METAL SANDWICH STRUCTURES
Robert I. Jaffee, Columbus, Ohio, assignor, by mesne assignments, to The Battelle Development Corporation, Columbus, Ohio, a corporation of Delaware
Filed Mar. 3, 1958, Ser. No. 718,875
8 Claims. (Cl. 29—423)

This invention relates to a method of producing ribbed metal sandwich structures for applications requiring a light-weight stiff structure having useful properties at elevated temperatures.

In order to obtain the most efficient strength-weight ratio in a composite structure, it is necessary to utilize the full compressive yield strength of the material employed. The use of a sandwich structure has for some time been recognized as the optimum method of attaining this objective. There are two basic types of sandwich structures. In one type, referred to as the honeycomb sandwich, the facing material resists the full load. In a honeycomb sandwich, the core material serves the sole purpose of supporting the facing material to prevent premature breaking of the load-bearing faces. The other type, referred to as the corrugated- or ribbed-core sandwich, attains its strength by the combined action of the core and facing materials. High efficiency in ribbed sandwiches is obtained by proper design of the rib configuration and proper distribution of the material thickness in the ribs and facing materials.

The chief problem in the fabrication of sandwich structures is the development of a strong bond between the cover sheets and the internal component. Adhesive bonding, brazing, and welding are used depending upon the surface conditions. Adhesive bonding has the disadvantage that it can be used only when the assembly is to be used at relatively low temperatures. Brazing has the deficiency that brazed joints are difficult to prepare and the joint efficiency is generally very low. Welding of sandwich structures is generally done by spot- or resistance-welding techniques, both of which are time-consuming and costly operations. Many materials which are otherwise ductile become brittle when welded and cannot be used in welded assemblies.

This invention discloses a new method of joining facing materials to ribbed cores by roll bonding. This method has advantages in that continuous solid state bonds are obtained between the facing materials and the ribs and a considerable reduction in cost is realized.

The process is basically simple. Alternate sheets of rib material and a filler material are reduced by hot rolling between two sheets of the cover material. The cover plate and rib material may be selected from such corrosion-resistant metals as stainless steels, titanium and titanium alloys, nickel and nickel alloys, tantalum, molybdenum and columbium. The spacer material may be selected from the readily dissolved metals such as copper, mild steel, or others.

Figure 1:
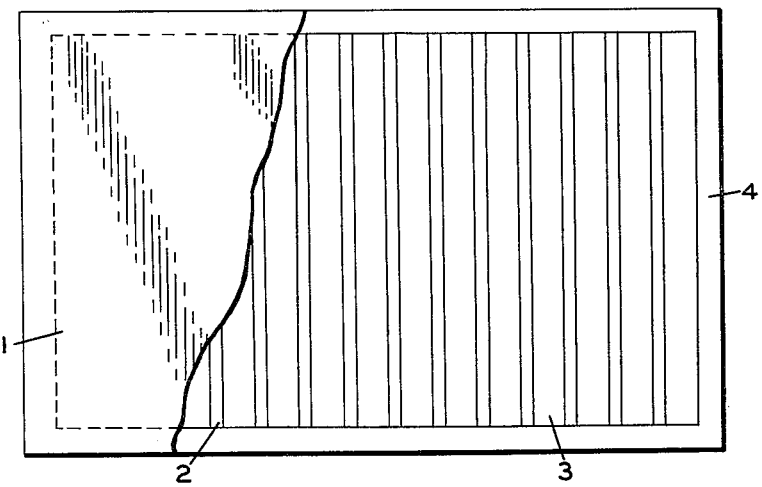
FIG. 1 is a view of a sandwich assembly prior to placing of the cover sheets.

FIG. 1 shows a view of an assembly prior to placing of the cover sheets. The direction of rolling is parallel to the direction of the ribs, so that most of the reduction results in increased length. Thus, the rib thickness does not change during bonding. The length of the sheet as well as the cover-plate thickness depend on the initial component dimensions and the amount of reduction in rolling, while the width of the finished sheet is controlled only by the width of the rolls available. During the rolling process, pressure welds of extreme strength are developed; in many instances failure of a roll-bonded sandwich occurs through the rib rather than the weld.

Figure 2:
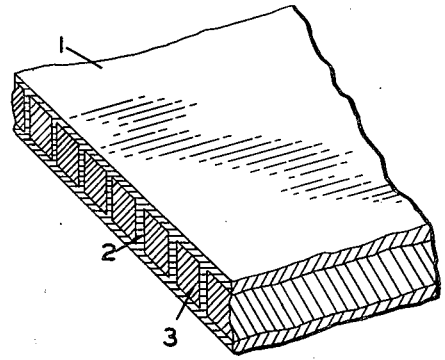
FIG. 2 is a sectional view of a sandwich assembly after rolling.

FIG. 2 shows a rolled section before removal of the filler material. Following fabrication, the filler material is removed by preferential chemical attack.

Figure 3:
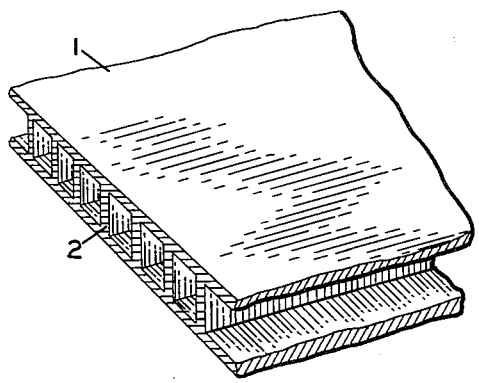
FIG. 3 shows the same section after removal of the filler material.

FIG. 3 is a sectional view of the same sandwich after removal of the filler material. Considerable forming of the ribbed sheet is possible if forming is done prior to removal of the filler material. For example, cylinder components containing formed mounting pads, etc., could be fabricated prior to removal of the filler material. The process therefore is capable of preparing extremely complex sandwich structures as well as flat-sheet components.

Although the immediate objective of the method is making ribbed sheet, other objectives of the roll-bonding method are for forming numerous other components ranging from box beams to turbine blades. Any part formable by rolling or roll forging can be made with integral ribs by the disclosed process. Also, the rib length can be controlled to form interconnected passages for fuel storage or integral cooling if desired. Because the cover sheet is not perforated and the bond is continuous, leakage should not be a problem with the roll-bonded sandwich.

To produce ribbed sandwich structures by applicant's process, two metals are chosen which possess different physical or chemical properties which will permit removal of one metal without damaging the other metal. For example, two metals may be used which have different rates of solution in a common solvent. The metals to be employed and the appropriate solvent may be readily chosen by those skilled in the art. The rib material and the facing material can be of the same composition or different compositions, but must be relatively inert to the common solvent. The spacer material to be removed by solution must be soluble in the solvent. After selection of materials, the initial composite pack is assembled taking into consideration the following factors. Both the thickness of the cover plates and the height of the ribs will be reduced by the percentage that the pack is reduced in rolling. The length of the pack will be increased by the ratio of original pack thickness to final pack thickness. No significant change in width of the cover plates or ribs will occur during rolling when side supports are used to prevent lateral flow. The initial composite pack is designed, taking into consideration the effect of rolling on the above factors and the desired design of the finished component. FIG. 1 shows the initial assembly consisting of the cover plates 1, the rib material 2, the spacer material 3, and the side supports 4. The side supports may be of the same material as the cover plates or a different material with about the same deformation resistance. After assembly the cover plates may be welded to the side supports and to end supports to produce a completely enclosed pack. The pack is then rolled to the desired thickness during which time the ribs are bonded to the cover plates forming a continuous bond along the entire length of each rib. The end and side supports are cut off, leaving the composite sheet complete with the soluble spacer material. In this condition the composite sheet may be formed into shapes by bending or other forming operation, or it may be desired to use it as flat sheet. When in the shape desired for use, the spacer material is leached out by immersing the entire composite in a solvent which will dissolve the spacer material but not the rib and cover plate material. After dissolving the spacer material, the composite sheet is ready for use.

The ribbed metal sandwich structure produced by this method has several unique properties. One is the continuous bond formed between the ribs and cover plates by the combination of heat and pressure during rolling. Another is the ability of the structure to be formed into many shapes without harming the bond between the ribs and cover plates if the forming is done prior to removal of the spacer material.

Applicant's invention may be further illustrated by the following examples:

*Example I*

It was desired to produce a composite ribbed sheet from titanium having the following dimensions:

|  | Inches |
| --- | --- |
| Total thickness | 0.1 |
| Width | 3⅝ |
| Cover plate thickness | 0.016 |
| Rib width | 0.006 |
| Distance between ribs | 0.125 |
| Rib height | 0.068 |
| Length | 18 |

It was desired to roll the initial pack assembly a total of 80 percent reduction. Therefore, the initial pack was assembled as follows:

|  | Inches |
| --- | --- |
| 2 cover plates, titanium | 4 x 4 x 0.080 |
| 23 ribs, titanium | 3⅝ x 0.340 x 0.006 |
| 25 spacers, copper | 3⅝ x 0.340 x ⅛ |
| 2 side plates, titanium | 3⅝ x 0.340 x 3/16 |
| 2 end plates, titanium | 4 x 0.340 x 3/16 |

The 2 side plates and 2 end plates were welded together to form a yoke 4 inches by 4 inches with an open center section 3⅝ inches by 3⅝ inches. The thickness of the yoke was 0.34 inch. The 25 spacers and 23 ribs were placed alternately in the yoke starting with a spacer and ending with a spacer. Because of slight variation in thickness of the spacing no slack occurred in the assembly. If some slack had occurred, skims of copper would be used to produce a compact assembly. The cover plates were then welded on to the top and bottom using a weld bond along the outside edges only. The assembly was put in an additional stainless steel box-shaped yoke and then hot-rolled at 1400° F. at 10 percent reduction per pass. The rolling direction was in the long direction of the ribs. The stainless steel yoke was broken off at a thickness of 0.13 inch. Rolling was continued to 0.1 inch. The over-all dimensions of the pack were approximately 20 inches long by 4¼ inches wide by 0.1 inch thick. After removal of the side plates and end plates, the dimensions of the final pack were approximately 18 inches long by 3⅝ inches wide by 0.1 inch thick. Samples cut from this composite structure showed excellent bonds between the ribs and cover plates, with very little distortion of the ribs. In other samples, the copper was dissolved out of the composite by heating in warm (approximately 200° F.) nitric acid (70 percent $HNO_3$). The resultant composite sandwich was light weight, rigid, and, because of the good bond, could be used at elevated temperatures.

*Example II*

A rectangular yoke of carbon steel was prepared. The inside dimensions of this yoke were approximately 3½ inches by 9¾ inches. The outside dimensions were approximately 4¾ inches by 11 inches. A titanium alloy containing 6 percent aluminum and 4 percent vanadium and ⅛-inch-thick copper separators were alternately placed lengthwise inside the carbon steel yoke. The titanium alloy ribs were approximately 0.05 inch thick. Cover plates, 4¾ inches by 11 inches, were prepared of the titanium alloy and were used to fully enclose the rectangularly shaped carbon steel yoke. The thickness of this pack was approximately 0.515 inch. Again, a stainless steel box-shaped yoke was placed around the outside of the pack. With the stainless steel yoke thus attached, the pack thickness was approximately 1.55 inches.

The sample as thus prepared was hot-rolled at approximately 1400° F. to a thickness of about 0.310 inch. The stainless steel yoke was removed. The dimensions of the pack at this time were 11⅛ inches by 0.200 inch. Thus, a side spread of approximately ⅛ inch occurred during rolling which represents a variation of about 1 percent.

The carbon steel yoke was removed and then the copper was removed by etching in a concentrated nitric acid solution.

*Example III*

Alternately placed strips of titanium and mild steel were clamped between end pieces of titanium. The dimensions of the titanium ribs were 0.01 inch by ¾ inch and those of the mild steel were ⅛ inch by ¾ inch; the end clamping pieces of titanium were ¼ inch by ¾ inch. Top and bottom cover pieces of titanium were then welded to the titanium end pieces. The thickness of the over-all pack was approximately 1 inch.

The mild steel-titanium composite was hot-rolled at approximately 1400° F. to about 0.1 inch thick.

The mild steel was removed by etching in diluted nitric acid. Heating the etching solution increased the rate of removal of the mild steel.

The above examples are intended to be illustrative of applicant's process but are not intended to be limiting thereof. Many additional applications and combinations of materials will be immediately obvious to those skilled in the art.

Many uses for hollow, ribbed metal sheets prepared according to applicant's process will be apparent to those having a need for said sheets. Such sheets will, of course, be used most frequently where weight of parts is an important factor. For example, many aircraft parts are currently of hollow, ribbed construction. Specifically, the wings, tail assembly, and other air frame parts, as well as parts of the engine housing, lend themselves to hollow, ribbed sheet structure.

It will be apparent that new and useful methods for preparing hollow, ribbed sheets have been described. Although several preferred embodiments of the invention have been described, it is apparent that modifications may be made therein by those skilled in the art. Such modifications may be made without departing from the spirit or scope of the invention, as set forth in the appended claims.

What is claimed is:

1. A method of producing hollow, ribbed titanium sheets of controlled dimensions and with a uniform, continuous bond between the titanium ribs and the top and bottom titanium sheets which comprises the steps of: assemblying alternate layers of titanium ribs and copper spacers in a rectangularly shaped titanium yoke; welding top and bottom titanium cover plates on the yoke; hot-rolling the titanium-copper sandwich at approximately 1400° F., in a direction parallel to the direction of the ribs, to a predetermined thickness; and selectively removing the copper spacers.

2. A method of producing hollow, ribbed titanium sheets of controlled dimensions and with a uniform, continuous bond between the titanium ribs and the top and bottom titanium sheets which comprises the steps of: assembling alternate layers of titanium ribs and mild steel spacers in a rectangularly shaped titanium yoke; welding top and bottom titanium cover plates on the yoke; hot-rolling the titanium-mild steel sandwich at approximately 1400° F., in a direction parallel to the direction of the ribs, to a predetermined thickness; and selectively etching the mild steel spacers with nitric acid solution.

3. A method of producing hollow, ribbed titanium alloy sheets of controlled dimensions and with a uniform, continuous bond between the titanium alloy ribs and the top and bottom titanium alloy sheets which comprises the steps of: assembling alternate layers of titanium alloy ribs and copper spacers in a rectangularly shaped titanium alloy yoke; welding top and bottom titanium alloy cover plates on the yoke; hot-rolling the titanium alloy-copper sandwich at approximately 1400 F., in a direction parallel to the direction of the ribs, to a predetermined thickness; and selectively etching the copper spacers with nitric acid solution.

4. A method of producing hollow, ribbed titanium sheets of controlled dimensions and with a uniform, continuous bond between the titanium ribs and the top and bottom titanium sheets which comprises the steps of: assembling alternate layers of titanium ribs and copper spacers in a steel yoke; attaching top and bottom titanium cover plates on the yoke; hot-rolling the titanium-copper sandwich at approximately 1400° F., in a direction parallel to the direction of the ribs, to a predetermined thickness; and selectively etching the copper spacers with nitric acid solution.

5. A method of producing hollow, ribbed titanium sheets of controlled dimensions and with a uniform, continuous bond between the titanium ribs and the top and bottom titanium sheets which comprises the steps of: assembling alternate layers of titanium ribs and mild steel spacers in a steel yoke; attaching top and bottom titanium cover plates on the yoke; hot-rolling the titanium-mild steel sandwich at approximately 1400° F., in a direction parallel to the direction of the ribs, to a predetermined thickness; and selectively etching the mild steel spacers with nitric acid solution.

6. A method of producing hollow, ribbed titanium alloy sheets of controled dimensions and with a uniform, continuous bond between the titanium alloy ribs and the top and bottom titanium alloy sheets which comprises the steps of: assembling alternate layers of titanium alloy ribs and copper spacers in a steel yoke; attaching top and bottom titanium alloy cover plates on the yoke; hot-rolling the titanium alloy-copper sandwich at approximately 1400° F., in a direction parallel to the direction of the ribs, to a predetermined thickness; and selectively etching the copper spacers wtih nitric acid solution.

7. A method of producing hollow, ribbed metal sheets of controlled dimensions and with a uniform continuous bond between the ribs and the sheets which comprises the steps of: assembling in a metal yoke two different metals in alternate layers, one metal being a rib and the other a spacer; attaching top and bottom metal cover sheets; hot rolling the metal sandwich until a continuous bond between the ribs and the cover sheets and the desired thickness are obtained; and selectively removing the spacer metal from between the top and bottom metal sheets.

8. A method of producing hollow, ribbed metal sheets of controlled dimensions and with a uniform continuous bond between the ribs and the sheets which comprises the steps of: assembling in a metal yoke two different metals in alternate layers, one metal being a rib and the other a spacer; attaching top and bottom metal cover sheets; hot rolling the metal sandwich to form a continuous bond between the ribs and the metal sheets; and selectively removing the spacer metal from between the top and bottom metal sheets by chemical etching.

References Cited in the file of this patent

UNITED STATES PATENTS

| | | |
|---|---|---|
| 1,604,216 | Brainin | Oct. 26, 1926 |
| 2,047,555 | Gardner | July 14, 1936 |
| 2,214,339 | McKee | Sept. 10, 1940 |
| 2,804,285 | Peterson | Aug. 27, 1957 |
| 2,814,470 | Peterson | Nov. 26, 1957 |
| 2,851,770 | Fromson | Sept. 16, 1958 |